United States Patent Office 3,052,669
Patented Sept. 4, 1962

3,052,669
PROCESS FOR MAKING ALKYLENIMINES
Gilbert Gavlin, Lincolnwood, and Kiyoshi Hattori, Chicago, Ill., assignors to The Richardson Company, Melrose Park, Ill., a corporation of Ohio
No Drawing. Filed Feb. 24, 1959, Ser. No. 794,851
6 Claims. (Cl. 260—239)

This invention is concerned with a new process for making alkylenimines, such as ethylenimine and dimethylethylenimine.

A number of processes have heretofore been proposed for the production of alkylenimines and, particularly, ethylenimine. However, many of these processes result in an expensive product, due either to the relatively high cost of the basic compounds used or the relatively low yields of the process.

Accordingly, one of the objects of this invention is to provide a new and improved process for the preparation of ethylenimine and certain of its lower alkylenimine homologues.

A further object is the provision of a process of the foregoing type which is economical and will result in reasonably high yields.

These and other objects are accomplished by subjecting 2-oxazoline to the action of sulfuric acid, to form an amino sulfate salt followed by treating the salt with a base to form the imine. Several methods for preparing oxazolines from inexpensive materials have been proposed, thereby making the production of alkylenimines from 2-oxazoline, in accordance with the simplified procedure presented herein, particularly attractive. For example, Ritter (JACS 72, 5577—1950) discloses the preparation of oxazolines from relatively inexpensive methallyl chloride. Others have suggested that oxazolines may be prepared by reacting a chlorohydrin with a nitrile followed by treating the imino ether formed with a base, a similarly inexpensive process.

The 2-oxazoline employed in accordance with the present invention has the following generic formula:

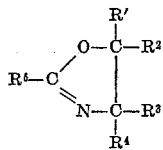

wherein $R'$, $R^2$, $R^3$, $R^4$, and $R^5$ may be hydrogen or an alkyl group of the class consisting of methyl, ethyl or propyl groups. As a limited modification, any one of the foregoing "R" groups may be the phenyl group. However, only one such phenyl group should be present in the oxazoline. If more than one phenyl group is present, especially in association with either of the two adjacent carbon atoms which ultimately form a part of the imine ring, it will be found exceedingly difficult, if not impossible, to form the desired imine ring during the final step of the process.

Imines obtained from 2-oxazoline in accordance with the present invention have the following generic formula:

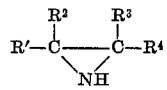

The first step in the preparation of the desired imine comprises subjecting the oxazoline to the action of sulfuric acid. The acid concentration may vary, however, the total acid should be sufficient to provide equal molar proportions with respect to the oxazoline present. Initially, the reaction mixture may be heated under reflux conditions, either at atmospheric pressure or at reduced pressure, if desired. After refluxing, the reaction mixture is subjected to distillation wherein water and by-product organic acid is removed. Alternately, the acid reaction step may be carried out completely under distillation conditions wherein the acid is present as a moderately dilute solution. The time required to distill off water is ample to complete what is considered to be hydrolysis of the oxazoline. As distillation continues, the mass becomes viscous and eventually will form a solid cake. Some degree of care should be exercised during the distillation to prevent charring and possible decomposition of the amino sulfate salt formed. Preferably, a uniform heating means, such as an oil bath, should be used.

It is believed that the foregoing reaction results in an initial hydrolysis of the oxazoline to an intermediate amino alcohol followed by subsequent esterification of the amino alcohol to the amino sulfate salt. However, by reason of the present process, it is not necessary to isolate intermediate products, but rather the present process enables the conversion of the oxazoline directly to the amino sulfate salt.

The amino sulfate salt is removed from the reaction container and suspended in water. If desired, the salt may be neutralized with alkali. The amino sulfate salt in water solution is then added to a hot concentrated solution of a strong base, for example, alkalis such as sodium or potassium hydroxide. To obtain the maximum yield of imine, the base should be maintained at a minimum temperature of about 90° C. If temperatures much below this minimum are used, the imine yield will decrease and undesirable side reactions may occur, such as hydrolysis of the amino sulfate salt. Further, the basic solution should have a minimum base concentration of about thirty percent and may range up to the use of a solid base. A minimum concentration of about fifty percent base is preferred to insure maximum yields. The imine is formed immediately upon contact of the amino sulfate salt with the alkali and is distilled off together with water. The distillate may be collected by means of a condenser. Imines are normally soluble in water, however, if an alkali, such as sodium or potassium hydroxide, is placed in the distillate receiving container, the imine will separate from the alkali solution and may be decanted.

While the amino sulfate salt is preferably added to the hot concentrated alkali in water solution, it is possible to add the salt directly as a solid. The amino sulfate salt should be added as rapidly as possible consistent with maintaining the temperature of the alkali and preventing the contents of the reaction container from being discharged due to the rapid formation of imine vapors.

By means of the foregoing process, yields of up to eighty percent, based on the oxazoline, have been obtained with an average yield of better than sixty percent.

In the process, either the oxazoline or a salt of the oxazoline may be used. The following example, directed to the preparation of dimethylethylenimine, employs the oxazoline hydrochloride.

*Example*

To 56.5 grams of 2,4,4-trimethyl-2-oxazoline hydrochloride (.377 mole) was added 100 ml. water and 23 ml. concentrated sulfuric acid (.42 mole). The solution was refluxed two and one-half hours. The solution was then distilled at a reduced pressure of about 15–20 mm. of mercury obtained by use of a water aspirator, heat being applied by the flame of a Bunsen burner until the pot temperature reached 125°. At this point, an oil bath, maintained at 140°–155°, was placed around the flask for approximately one hour. A tan-white cake of 2-amino-2,2-dimethylethyl hydrogen sulfate was solidified from the solution.

The crude sulfate was removed from the flask, suspended in 100 ml. of water and neutralized with 30 grams of sodium hydroxide (.75 mole) while cooling to keep the temperature below 32° C.

The above solution was added rapidly dropwise to a boiling alkali solution comprising 100 grams of sodium hydroxide in 100 ml. of water. Distillate evolved was collected over sodium hydroxide pellets while maintaining the receiver flask in an ice bath.

The two layers, consisting of water and dimethylethylenimine, in the receiver flask were separated and the imine was again dried over sodium hydroxide. The weight of the dried imine was 16.7 grams (.235 mole). This represented a 62.3% yield based on the oxazoline.

The product was found to have a micro boiling point of 71° (Lit. 70°), refractive index of $N_D^{25}=1.4077$ (Lit. 1.4052, 1.4062), phenyl thiourea derivative, melting point 92–94° (Lit. 91–92°) and picrate derivative melting point 129–130° (Lit. 124–126°).

While the initial reflux step, in the above example, was extended over a period of two and one-half hours, such a thorough procedure is not considered a practical necessity. As previously indicated hereinabove, the desired reactions may be accomplished by using only distillation conditions, especially when employing moderately dilute acid concentrations, as the normal time required to remove water by distillation will permit the required reactions to take place.

As an alternate procedure, the initial acid reaction may be conducted in the presence of a suspending medium for the amino sulfate salt which prevents the formation of a solid cake and, by heat dissipation, correspondingly, eliminates, to some extent, the tendency of the salt to become charred or decomposed. A typical solvent which has proven satisfactory is o-dichlorobenzene. The use of such a solvent results in the formation of a thick, viscous liquid rather than a solid cake. Solvents, for use in the foregoing manner, should be relatively high boiling and not susceptible to sulfonation.

Alkylenimines and, particularly, ethylenimine have found use as modifying agents for cellulosic materials. Thus, ethylenimine has been employed to increase the wet strength of paper, for water-proofing fibers and as an anchor coating for cellophane. New resin compounds may also be prepared for use as coatings and the like by polymerizing the alkylenimines. The dimethylethylenimine homologue has certain advantages over, for example, ethylenimine, particularly with respect to stability. Unless carefully controlled, ethylenimine tends to undergo spontaneous polymerization, which may reach explosive proportions. Further, due to the fact that dimethylenimine is less volatile than ethylenimine, it, correspondingly, is less likely to cause irritation or toxicity.

Having described the invention and an exemplary embodiment thereof, the same is only intended to be limited by the scope of the following claims.

We claim:

1. A process for making an alkylenimine having the formula

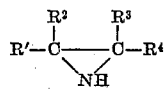

from an oxazoline having the formula

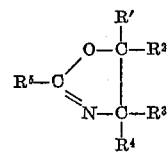

wherein R', R², R³, R⁴, and R⁵ are selected from the class consisting of hydrogen and methyl, ethyl and propyl groups, comprising the steps of subjecting the oxazoline to the action of sulfuric acid to form an amino sulfate salt and reacting said salt with an alkaline hydroxide having a minimum concentration of approximately fifty percent at a minimum temperature of about 90° C.

2. A process as described in claim 1 wherein said oxazoline is initially subjected to the action of said sulfuric acid under reflux conditions followed by distillation conditions wherein water and by-product acid are removed and the reaction mass concentrated.

3. A process as described in claim 1 wherein said oxazoline is subjected to the action of said sulfuric acid under distillation conditions wherein water and by-product acid are continually removed and the reaction mass concentrated.

4. A process as described in claim 6 wherein said oxazoline is initially subjected to the action of said sulfuric acid under reflux conditions followed by distillation conditions wherein water and by-product acid are removed and the reaction mass concentrated.

5. A process as described in claim 6 wherein said oxazoline is subjected to the action of said sulfuric acid under distillation conditions wherein water and by-product acid are removed and the reaction mass concentrated.

6. A process of making 2,2-dimethyl-ethylenimine which comprises the steps of subjecting 2,4,4-trimethyl-2-oxazoline to the action of sulfuric acid to form 2-amino-2,2-dimethylethyl hydrogen sulfate and reacting said sulfate with an alkali hydroxide having a minimum concentration of approximately fifty percent at a minimum temperature of about 90° C.

References Cited in the file of this patent
UNITED STATES PATENTS 2,206,273    Ulrich _____ July 2, 1940
2,931,804    Spivak _____ Apr. 5, 1960

OTHER REFERENCES

Campbell et al.: J. Org. Chem., volume 8, pages 103–9 (1943).

Elderfield: Heterocyclic Compounds, volume 5, pages 386–7 (1957).